United States Patent
Kotla et al.

(12)

(10) Patent No.: US 12,423,363 B2
(45) Date of Patent: Sep. 23, 2025

(54) WARM TIER STORAGE FOR SEARCH SERVICE

(71) Applicant: Amazon Technologies, Inc., Seattle, WA (US)

(72) Inventors: Ramakrishna Kotla, Cupertino, CA (US); Eli R Fisher, San Francisco, CA (US); Min Zhou, Sunnyvale, CA (US); Ankit Malpani, Santa Clara, CA (US); Ankit Kumar Jain, Mountain View, CA (US); Andi Gutmans, Menlo Park, CA (US); Bhaven Avalani, Cupertino, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/859,923

(22) Filed: Apr. 27, 2020

(65) Prior Publication Data

US 2021/0165840 A1 Jun. 3, 2021

Related U.S. Application Data

(60) Provisional application No. 62/942,037, filed on Nov. 29, 2019.

(51) Int. Cl.
*G06F 16/953* (2019.01)
*G06F 16/951* (2019.01)
*G06F 9/455* (2018.01)

(52) U.S. Cl.
CPC .......... *G06F 16/953* (2019.01); *G06F 16/951* (2019.01); *G06F 9/45533* (2013.01)

(58) Field of Classification Search
CPC .. G06F 16/953; G06F 16/951; G06F 16/2228; G06F 2009/4557; G06F 2009/45575
See application file for complete search history.

(56) References Cited

U.S. PATENT DOCUMENTS 8,959,067 B1 * 2/2015 Patiejunas ........... G06F 16/2379
707/696
9,645,761 B1 * 5/2017 Ben Dayan ........... G06F 3/0635
(Continued)

FOREIGN PATENT DOCUMENTS

CN 106649354 A * 10/2017
CN 107728938 2/2018
(Continued)

OTHER PUBLICATIONS

International Search Report and Written Opinion mailed Feb. 23, 2021, for International Patent Application No. PCT/US2020/061769, filed Feb. 23, 2020.
(Continued)

*Primary Examiner* — Kris E Mackes
(74) *Attorney, Agent, or Firm* — Davis Wright Tremaine LLP

(57) ABSTRACT

Systems and techniques are described herein for tiered storage of customer data accessed by a search service of a computing resource service provider. In some aspects, customer data may be received by a search instance executed across a plurality of compute nodes and provisioned by a search service. The customer data may be indexed and the data and resulting index may be stored locally by a first pool of hot compute nodes of the search instance. The customer data and index may be migrated and stored remotely by a data storage service. Metadata associated with the customer data and/or index may be stored in a second pool of warm compute nodes of the search instance. The warm compute nodes, upon receiving a request to access the customer data, may identify a location of the customer data and retrieve the customer data from the data storage service according to the metadata.

21 Claims, 9 Drawing Sheets

(56) References Cited

U.S. PATENT DOCUMENTS

| | | | | |
|---|---|---|---|---|
| 10,437,799 | B2* | 10/2019 | Dain | G06F 40/186 |
| 10,872,097 | B2* | 12/2020 | Miller | G06F 16/27 |
| 2011/0154104 | A1* | 6/2011 | Swanson | G06F 11/1666 |
| | | | | 711/E12.001 |
| 2016/0239219 | A1 | 8/2016 | Lotem et al. | |
| 2017/0139978 | A1* | 5/2017 | Hayworth | G06F 16/2255 |
| 2017/0176033 | A1* | 6/2017 | Tan | G05B 19/048 |
| 2017/0269868 | A1* | 9/2017 | Yoshida | G06F 3/0647 |
| 2018/0157654 | A1* | 6/2018 | Dain | H04L 67/1097 |
| 2018/0188964 | A1* | 7/2018 | Resch | G06F 3/067 |
| 2019/0087432 | A1* | 3/2019 | Sion | G06F 21/62 |
| 2019/0236150 | A1* | 8/2019 | Zaslavsky | G06F 16/2308 |

FOREIGN PATENT DOCUMENTS

| | | | |
|---|---|---|---|
| CN | 107728938 | A | 2/2018 |
| CN | 110196851 | | 9/2019 |
| CN | 110196851 | A | 9/2019 |

OTHER PUBLICATIONS

Niu et al., "Building Semi-Elastic Virtual Clusters for Cost-Effective HPC Cloud Resource Provisioning," IEEE Transactions on Parallel and Distributed Systems, 27(7): 1915-1928, Jul. 1, 2016.

Wang, "A Survey of Web Caching Schemes for the Internet," Computer Communication Review, 29(5):36-46, Oct. 5, 1999.

European Intellectual Property Office Article 94(3) EPC Communication dated Jun. 14, 2024, 7 pages.

China National Intellectual Property Administration First Office Action date Dec. 25, 2024, Application No. 202080082996.9, 13 pages.

China National Intellectual Property Administration Second Office Action date Apr. 25, 2025, Application No. 202080082996.9, 10 pages.

\* cited by examiner

WARM TIER STORAGE FOR SEARCH SERVICE

CROSS-REFERENCE TO RELATED APPLICATIONS

This application claims the benefit of U.S. Provisional Patent Application No. 62/942,037, filed Nov. 29, 2019, the disclosure of which is incorporated herein by reference in its entirety.

BACKGROUND

The use of network computing and storage has proliferated in recent years. In particular, the generation of machine generated data and analytics of that data has drastically increased in recent years. As a result, customers are generating large amounts of data that they need to be able to analyze effectively and efficiently. Log analytics is a key component in many verticals—such as IT operational analytics (monitoring, alerting and cost management of infrastructure resources), SIEM (Security Information and Event Management), and APM (Application Performance Management)—where the machine generated data is growing at an exponential rate. It is fueled by adoption of the cloud, migration of IT to cloud computing resources, and increasing use of IoT and mobile devices. As a result, the cost of log analytics on these large and growing data sets became untenable for our customers. Facing these rising costs of analyzing this data, many customers are forced to make false tradeoffs reducing the retention periods of data at the cost of missing on insights.

BRIEF DESCRIPTION OF THE DRAWINGS

Various techniques will be described with reference to the drawings, in which.

DETAILED DESCRIPTION

Figure 1:
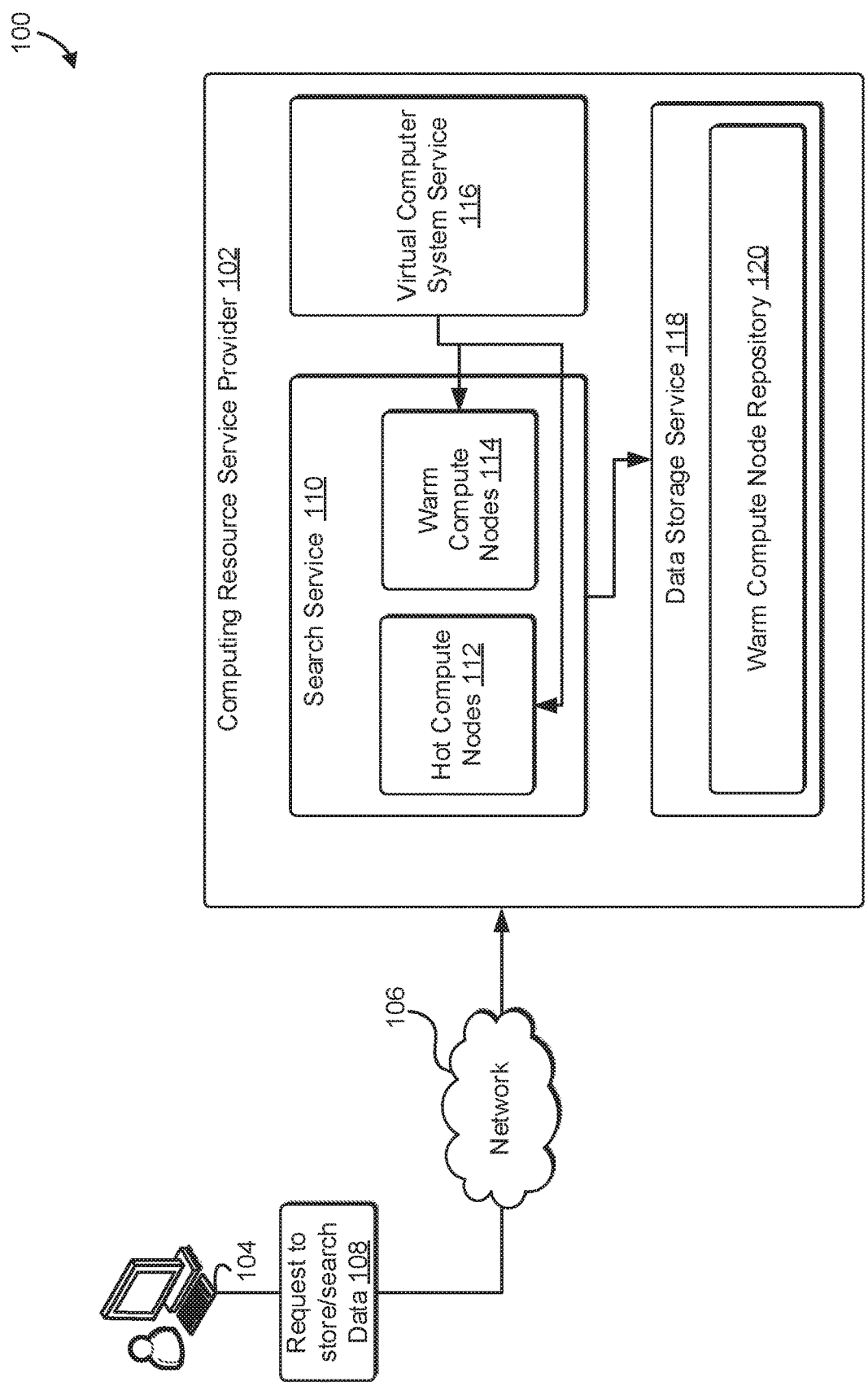
FIG. 1 illustrates an environment in which the described techniques may be practiced, in accordance with at least one embodiment.

Systems and methods are described herein for storing and searching customer data more efficiently using a tiered storage structure. A data search service may be provided by a computing resource service provider. The data search service may utilize a number of computing nodes, which may be virtual machine instances, to store and perform operations on customer data. The data search service may launch a search instance which may execute and manage a number of compute nodes and interface with remote storage, such as may be provided by a data storage service, for a number of customers. Each customer may have separate set of compute nodes executing in different search instances, so that one customer's data may be isolated from other customers' data. Each search instance may access or be associated with one or more logical data containers that provide remote storage for the search instance. Upon receiving or ingesting customer data, such as may be in the form of logs and/or other machine generated data, a first pool of hot compute nodes of a search instance may index the data and store the data locally, such that each node of the first pool of nodes may index and store a portion of the customer data and associated index locally. Upon satisfaction of a migration condition, such as elapsed time, or data not be accessed frequently, the data and index or indices managed by the first pool of compute nodes may be migrated to remote storage, such as one or more logical data containers that may be provided by a data storage service, at less cost. A second pool of warm compute nodes may maintain metadata indicating where the customer data is stored remotely by the data storage service. When the data search service receives a request to access or perform operations on the customer data, the warm nodes may obtain the customer data from the data storage service according to the metadata.

In some cases, upon migration, indices may be stored on more than one compute node, to ensure that the migrated data may be readily accessed, even immediately after the migration, such as by one or more warm compute nodes. In some cases, the warm compute nodes may also locally store a portion of the customer data and/or indices of that data (e.g., frequently accessed data), to facilitate more efficiently retrieving customer data to perform operations on that data. The warm compute nodes may more quickly access the customer data that is stored locally by the warm computes than by retrieving that data from remote storage. In some aspects, the warm compute nodes may also locally store search results from past queries performed on the customer data or results from one or more operations performed on the data. In this way the warm compute nodes may respond to future queries that involve at least a subset of the prior search results, more efficiently, both in terms of time to provide a response to the queries and in using less resources to do so. In yet some cases, data sets or aggregations of data may be pre-computed prior to actually receiving a request for the aggregated data, to reduce response times by the data search service.

Upon receiving a request to access customer data and/or perform one or more operations on the customer data, the data search service may direct the request to an appropriate compute node or pool of compute nodes. A request that includes ingesting new customer data may be directed to the first pool of hot compute nodes, which may index the data and store it locally. A request that includes other operations, such as performing a search of specific data or accessing specific data, may be directed to one or both of the first pool of hot compute nodes or the second pool of warm compute nodes, depending on which nodes are responsible for the specified data. If a hot node or nodes are determined to be responsible for the specified data, the request may be sent to those nodes, which may access the data locally, perform any operations specified in the request, and return the results. If a warm node or nodes are determined to be responsible for the data, the request may be sent to the second pool of warm compute nodes. The second pool of warm nodes may then determine if the data is stored locally and if so retrieve the data. If the data is determined to be stored remotely, the warm compute node or nodes may access the data from the remote location. The warm compute node or nodes may then perform the requested operations on the data and return the results.

In some cases, upon receiving a request to perform operations on customer data, the data search service/search instance may identify which index or indices correspond to the requested data, and pre-fetch those indices from remote storage, to decrease retrieval times of the data. In yet some cases, indices that are searched often may be locally stored by one or more warm compute nodes to improve retrieval times. Indices relevant to a request, or relevant to common or predicted requests, may also be pre-fetched and/or stored locally by one or more warm compute nodes to improve retrieval times.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including some or all of the following: (1), reducing the amount of storage and computational resources used to store and search large sets of customer data and (2), more quickly access data stored remotely from a data search service, etc.

FIG. 1 illustrates an example environment 100 in which the described techniques for efficiently storing, accessing, and performing operations on customer data may be implemented. As illustrated, a client or customer device 104 may interact with a search service 110 provided by a computing resource service provider 102 through one or more networks 106. The computing resource service provider 102 may also provide a virtual computer system service 116 and a data storage service 118, which may, in conjunction with the search service 110, store, manage, and provide computing resources to perform operations on customer data.

In some aspects, the search service 110 may be provided as a service by a computing resource service provider 102. In some examples, the computing resource service provider 102 may be an entity that provides one or more computing resource services to its customers individually or as a combination of services of a distributed computer system. The computing resource service provider 102 may include a collection of physical and/or virtual computing devices and systems, including physical computing systems (e.g., servers, desktop computers, laptop computers, thin clients, and handheld devices such as smartphones and tablets), virtual computing systems (e.g., as may be provided by the computing resource service provider using one or more resources associated therewith), hardware or software-based storage devices, including both directional and omnidirectional or non-directional media (such as hard drives, optical drives, solid state devices, virtual storage devices such as provided by the computing resource service provider, and the like), services (e.g., such as those accessible via application programming interface calls, web service calls, or other programmatic methods), and the like. Examples of types of computing resources provided by the computing resource service provider 102 include infrastructure-as-a-service (IaaS), platform-as-a-service (PaaS), and/or software-as-a-service (SaaS). The one or more computing resource services of the computing resource service provider 102 may be accessible to users or customers 104 via one or more networks 106 and may include services such as search services 110, virtual computer system services 116, data storage services 118, and other services, such as cryptography services, on-demand data storage services, notification services, authentication services, policy management services, task services and/or other such services. Not all embodiments described include all of the services described, and additional services may be provided in addition to, or as an alternative to, services explicitly described. The computing resource service provider 102 and services thereof may be implemented by system 900 described in greater detail below in reference to FIG. 9.

Customers of the computing resource service provider 102, such as the customer 104, may communicate with one or more of the services, such as the search service 110, via an interface, which may be a web services interface or any other type of customer interface over a network 106. Each service provided by a computing resource service provider 102 may have its own interface, and subsets of the services may have corresponding individual interfaces in addition to, or as an alternative to, a common interface. The customer 104 may communicate with the computing resource service provider 102 through a network 106, whereby the network 106 may be a communication network, such as the Internet, an intranet, an internet service provider (ISP) network and/or some other such network. Some communications from the customer device 104 to the search service 110, as described below, may cause the search service 110 to operate in accordance with one or more embodiments described or a variation thereof.

Various communications to/from the customer 104 may be orchestrated by a browser or other application executing on the customer 104. In an embodiment, the customer 104 communicates to the search service 110 through one or more application programming interfaces (API). In some examples, an application programming interface may be a set of subroutine definitions, communication protocols, and/or software tools that provide a method of communication from the customer 104 and the search service 110.

In an embodiment, the customer 104 is any entity operable to access systems such as the search service 110. In some examples, the customer 104 is an individual, group of individuals, business entity or other organization that has a business relationship with the computing resource service provider 102. In the present disclosure, it is contemplated that use of the term "customer" can include a computing device (also referred to as a "client device") used to perform operations under the control of or on behalf of the customer (e.g., to access a service 110 provided by the computing resource service provider 102). Examples of such a computing device include one or more instances of a physical computing instance (e.g., a physical server computer, a mobile communication device, a laptop computer, a tablet computer, a personal computer, a mainframe, etc.) or one or more instances of a virtual computing instance, such as a customer-accessible virtual machine hosted on one or more computer servers, or other computing system capable of communicating with a service provided by the computing resource service provider. In some examples, a "service"

refers to an executing computer application that provides functionality to another computer application.

The customer 104 may communicate with a search instance provided by search service 110 to store and perform various functions on customer data. The customer data may take a variety of forms and may come from one or multiple sources. The customer data may include log data, machine generated data, such as from IoT devices, structured data, unstructured data, and/or data organized in various ways, such as relational, non-relational, table-oriented, key-value pair, and the like. The customer data may be unloaded form a customer device 104, and/or from one or a number of sources, such as directly or indirectly from a number of devices monitored or managed by customer 104. The customer may utilize the search service to perform monitoring functions on operations performed by devices or sources of the data, to perform data or log analytics on the data to identify errors or problems with devices responsible for generating the data, and for a variety of other reasons and to perform other functions.

As illustrated, the search service 110 may launch one or more search instances, which may be customer specific. A search instance may be a distributed computer system to which search requests can be submitted for a set of data. The search instance may process the requests on a data set for which it is responsible. In some cases, a search instance may be executed across a plurality of compute nodes and attached to a logical data container, such as provided by a data storage service. In some cases, search service 110 may launch a number of search instances, each including a plurality of compute nodes, some type of data storage, and a customer endpoint, which may provide an interface for a customer to interact with customer data managed by the search instance. In some cases, a search instance may provide log analytics functionality, full text searching across customer data, and other monitoring and security analytic functionality. In some cases, the number of compute nodes, types of compute nodes, and amount of attached data storages may be managed by the search service, such as to accommodate new customer data as it is ingested by a search instance.

Each search instance may include a collection of physical and/or virtual computing devices, including hardware or software-based storage, that include two pools of compute nodes, a hot compute node pool 112 and a warm compute node pool 114, which may be provided by a virtual computer system service 116. The hot compute nodes 112 and the warm compute nodes 114 may be virtual machine instances, of similar or varying compute, memory, and other capabilities or resources. The search service 110 may, for each search instance, control and manage the number and types of compute nodes instantiated in the hot compute node pool 112 and the warm compute node pool 114 via API calls to the virtual computer system service 116. In some aspects, the search service 110 may utilize one or more search engines, such as ElasticSearch based on the Lucene library. In some cases, the search service 110 and specific search instances may be implemented by Amazon ElasticSearch Service, Google Elastic Cloud, Elasticsearch or Kibana in Alibaba Cloud, or other similar services, or a combination thereof. In some cases, a search instance may interact with one or a number of other services to provide data storage and query functionality.

Hot compute nodes/pool of nodes 112 may include computing nodes, with processing and data storage resources, that may index and locally store customer data. Hot compute nodes 112 may provide quick access to customer data, as the data is stored locally by the compute nodes, and may perform various operations on customer data, such as receiving, performing searches for specific data, sorting the data, and various other operations. The hot compute nodes 112 may be provisioned by the virtual computer system service 116, for example, via instructions from the search service 110. The warm compute nodes/pool of nodes 114 may include computing nodes, with processing and data storage resources, that may locally store metadata of or associated with customer data stored by the data storage service 118, such as in warm compute node repository 120. In some cases, warm compute nodes 114 may locally store portions of customer data and relevant indices as well. In some cases, the warm compute nodes may be configured with less data storage resources, to reduce operational costs of the warm compute nodes 114. In some cases, the warm compute nodes may be configured with ½, ⅓, ¼, ⅕, ⅙. . . ¹⁄₁₀ ratio of the data storage or memory resources as the hot compute nodes 112. In some cases, the ratio of local storage on one or more warm compute nodes to total data managed by the data storage service 118/search service 110 may be determined and fixed to optimize speed of generating a response to data queries. In some cases, the amount of data storage resources provisioned on one or the combined pool of warm compute nodes may be determined as a fraction of the total amount of customer data managed by the search service 110 or based on how much customer data is stored by data storage service 118 in the warm compute node repository 120.

In some cases, upon receiving new customer data, such as to index and store, from customer 104 or one or more devices associated with customer 104, the search service 110/search instance may provision or instruct the virtual computer system service 116 to provision, one or more additional hot compute nodes 112, warm compute nodes 114, and/or more data storage through the data storage service 118, to store and manage the new data.

As illustrated, the virtual computer system service 116 may be a collection of computing resources configured to instantiate virtual machine instances on behalf of the customer 104 directly or indirectly through the search service 110, including the hot compute nodes 112 and warm compute nodes 114. The search service 110 (or customer 104 directly) may interact with the virtual computer system service 116 (via appropriately configured and authenticated API calls) to provision and operate virtual computer systems that are instantiated on physical computing devices hosted and operated by the computing resource service provider 102. The virtual computer systems may be used for various purposes, such as to operate as servers supporting data storage for a customer coupled with compute capabilities to search, query, access, and perform other operations on the customer data, as both hot and warm compute nodes 112, 114. Virtual computer system service 116 may configure compute nodes 112 and 114 to have various processing units and/or processing capabilities, various amounts of data storage, and so on. Although the virtual computer system service 116 is shown in FIG. 1, any other computer system or computer system service may be utilized in the computing resource service provider 102, such as a computer system or computer system service that does not employ virtualization or instantiation and instead provisions computing resources on dedicated or shared computers/servers and/or other physical devices.

In some aspects, the computing resource service provider 102 may also provide a block-level data storage service, which may include one or more computing resources that collectively operate to store data for specific nodes of hot and warm compute nodes 112, 114, such as facilitated through the search service 110, using block-level storage devices (and/or virtualizations thereof). The block-level storage devices of the data storage service may, for instance, be operationally attached to virtual computer systems provided by the virtual computer system service 116 to serve as logical units (e.g., virtual drives) for the computer systems. A block-level storage device may enable the persistent storage of data used/generated by a corresponding virtual computer system where the virtual computer system service 116 may only provide ephemeral data storage.

As illustrated, the computing resource service provider 102 may provide a data storage service 118 that is separate from the compute nodes, which may be an on-demand data storage service, such as an object-based or block-based data storage service. The data storage service 118 may be implemented on a computer system, or abstraction thereof (such as one or more virtual machines, software containers, or other computing resource abstractions), implemented using hardware and software, and may comprise one or more processors and memory that stores executable instructions whose execution by the one or more processors causes the computer system to perform operations described herein. The data storage service 118 may provide isolated containers or partitions, referred to herein as logical data containers, for storing data. The data stored in the data storage service 118 may be organized into data objects or blocks within the logical data container. The data objects or blocks may have arbitrary sizes and may, in some instances, have constraints on size. Thus, the data storage service 118 may store numerous data objects of varying sizes. In some cases, the data storage service 118 may operate as a key value store that associates data objects with identifiers of the data objects which may be used by the customer 104 or search service 110 to retrieve or perform other operations in connection with the data objects stored by the data storage service 118. Access to the data storage service 118 may be through application programming interface (API) calls to the service, for example from the search service 110. It should be appreciated that the data storage service 118 may additionally or alternatively provide non-object based data storage, such as block data storage, table-oriented data storage, relational databases, and the like. However, for consistency and ease of reference, the described techniques will primarily be described in relation to object-based data storage systems.

In some cases, access to files or data objects that are stored directly with the data storage service 118 may be secured by policies stored and maintained by the data storage service 118 itself, and/or an identity and access management system that interacts with the data storage service 118, such as provided by a computing resource service provider 102. Some or all other attributes, such as storage class and creation date, may be stored in a given object's metadata. In some cases, file or object permissions, folder permissions, and attributes may be stored as object metadata in the data storage service 118.

As illustrated, upon receive a request to store customer data 108 through network 106, the search service 110 may direct one or more hot compute nodes 112 to index and store the customer data locally to the one or more hot compute nodes 112. In some cases, the data may be received directly from a customer 104, or may be collected from one or more computing devices or machines (e.g., IoT devices, etc.) associated with a customer account. Upon the satisfaction of a migration condition, the data and associated index or indices may be moved to less costly storage, such as to the data storage service 118, to be added to the warm compute node repository 120. The migration process may include assigning certain portions of the data to one or more warm compute nodes 114, which may maintain metadata associated with the customer data in local data storage. The metadata may include any of a variety of information concerning the customer data, and may further include locations or addresses of where specific portions of the data are stored in the data storage service 118, to enable various warm compute nodes to quickly identify, locate, and retrieve data from the data storage service. In some cases, the metadata stored by one or more compute nodes may be automatically selected. For example, if a certain data object is accessed more than a threshold number of times, metadata associated with that data object may be stored locally by one or more compute nodes, such as warm compute nodes, o enable faster retrieval of the data/metadata in the future. In other cases, the types, and other attributes of metadata maintained by one or more compute nodes may be configurable by a customer. In some cases, the warm compute nodes 114 may also locally store one or more indices of customer data that the specific node 114 is responsible for and or part or all of the customer data that the node 114 is responsible for. Indices and customer data that are frequently accessed or predicted to be accessed may be stored locally by one or more warm compute nodes 114 to enable faster retrieval of that data.

Upon receiving a request 108 to search data managed by the search service 110, the search service 110 may first determine which node or nodes of pools 112 or 114 are responsible for the requested data. The search service 110 may then send the request to that node or nodes 112, 114, to retrieve the specified data and perform one or more operations on the data. If a hot node 112 is responsible for the data, it may retrieve the data locally. If a warm node 114 is responsible for the data, it may check to see if the data is locally stored, and if not proceed to access the data from the data storage service 118. In any of these scenarios, the responsible node or nodes may then perform any operations on the data specified in the request 108, such as sorting, filtering, ordering the data, and so on. The search service 110 may then compile the results and respond to the customer 104.

In some cases, search service 110 may support running queries on the raw data stored by the data storage service 118 without transforming the data. In some cases, data may be encrypted in the data storage service 118, such as by request of the customer. In some cases, once data has been identified by the search service 110 for retrieval, data may be retrieve by block, such that only the blocks of data needed may be retrieved, by way of the use of indices. This may increase efficacies in retrieving large amounts of data.

Figure 2:
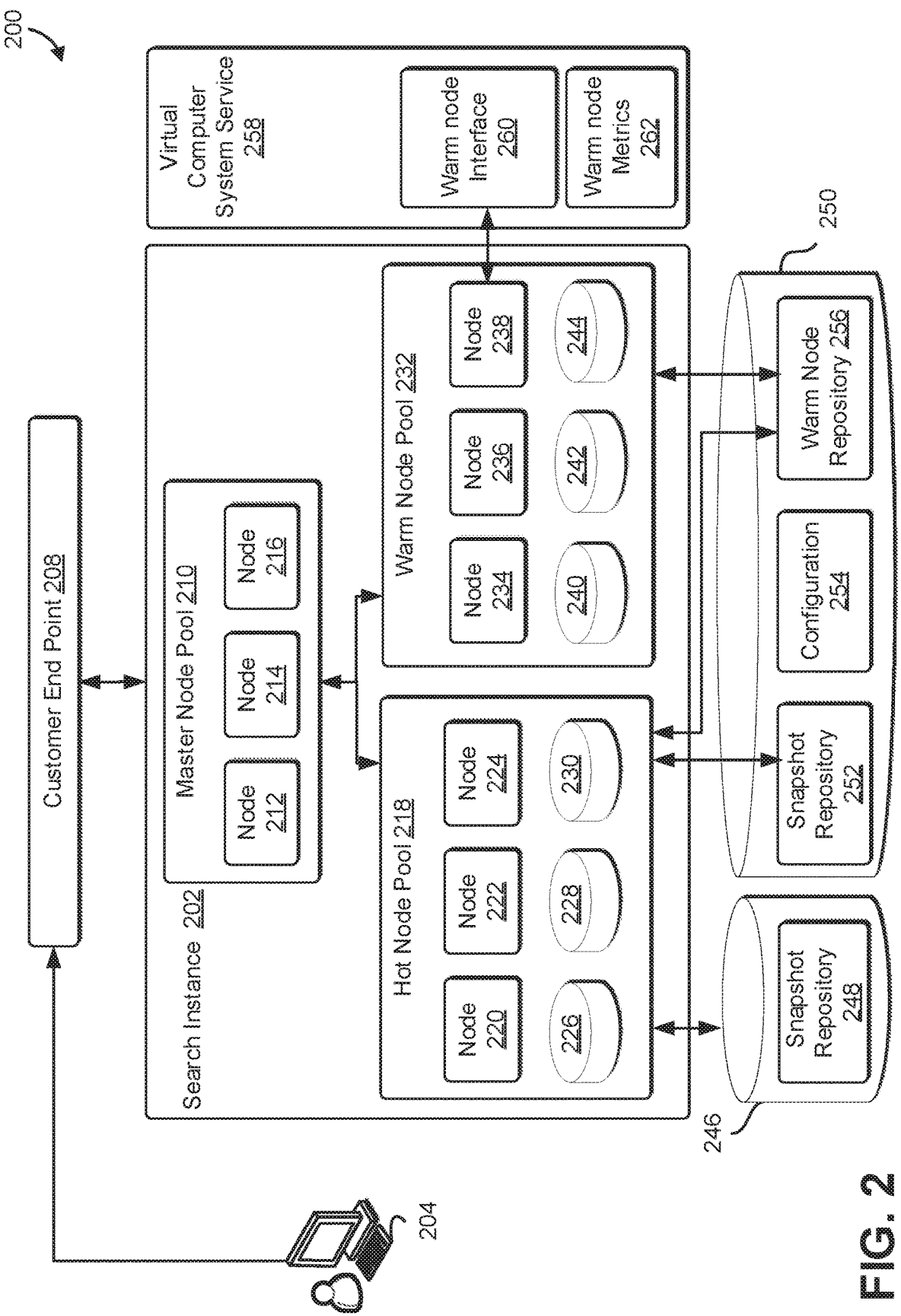
FIG. 2 illustrates an example data search service, in accordance with at least one embodiment.

FIG. 2 illustrates another environment 200 in which the described data storage and search techniques may be performed. Environment 200 may include a search instance 202, interacting with a virtual computer system service 258 and various data stores 246, 250, serving a customer 204 through a customer end point 208. The virtual computer system service 258, and data stores 246, 250 may include one or more aspects of similarly named components described above in reference to FIG. 1, and for the sake of brevity, will not be described again here.

As illustrated, a search service may launch a search instance 202, which may instantiate a number of compute nodes 210, 218, 232 for a specific customer and may assign those nodes and storage locations in data stores or logical data containers 246 and 250, such as may be provided by a data storage service, to a customer end point 208. The search instance 202 may thus isolate customer data to ensure privacy of the customer's data, and assign a number of customer endpoints to different sets of compute nodes and data store locations through different search instances, respectively. It should be appreciated that other configurations, such as multitenant compute nodes and data store locations are contemplated herein.

The search instance 202 may instantiate one or a pool of master nodes 210, which may include nodes 212, 214, 216. Master node or nodes collectively 210 may be responsible for processing customer requests, and interacting with a customer through customer end point 208. In some cases, master nodes 210 may process customer requests and direct the request to the appropriate node pools, such as the hot node pool 218 or the warm node pool 232, depending on the type of request (retrieve data or ingest it), and/or which nodes are responsible for the data. An example process for directing requests to the appropriate node or nodes will be described in greater detail below, in reference to FIG. 5. The master node pool 210 may maintain and track metadata of all the nodes (e.g., cluster of nodes) associated with a customer, via node state index metadata, snapshots of the node configurations and data stored and/or managed by each node, etc. In some cases, the master nodes 210 may do so by accessing snapshot information 252 stored in logical data container 252, or may access the metadata or snapshot information locally.

In some cases, the hot node pool 218 may include a number of compute nodes or virtual machine instances 220, 222, 224, each with attached data storage resources 226, 228, 230. The data storage resources may include any of a variety of storage devices, such as block storage, solid state drives, and so on. The hot compute or data nodes 220, 222, 224 may perform various operations, including indexing and storing indexed data or logs as they are ingested as well as running queries which address the hot indices maintained by the respective node or nodes 220, 222, 224.

When customers ingest data into the search instance 202 through the customer end point 208, the pool of hot nodes 218 may index and store the data and index or indices in attached storage 226, 228, 230, respectively. The hot nodes 220, 222, 224, or the pool 218 collectively may periodically (e.g., hourly, daily, or some other period of time) take snapshots of the current states of the nodes and the data they are storing and save the snapshots in snapshot repository 252, such as may be maintained remotely by a data storage service 250 associated with the search instance 202. The search instance 202 and/or master node pool 210 may access the snapshot repository 252 to aid in routing requests to appropriate nodes, determine whether specified data is stored by the search instance 202, and so on. In some cases, a separate customer snapshot repository 248 may be maintained by data storage service 250, a different account or logical data container 246 of data storage service 250, or by another data storage service 246. Customer snapshot repository 248 may provide direct access to a current snapshot of the data stored by search instance 202 to a customer, for example to enable to customer to more readily manage their data, In some cases, the warm node pool 232 may include a number of compute nodes or virtual machine instances 234, 236, 238 each with attached data storage devices or resources 240, 242, 244. The data storage resources may include any of a variety of storage devices, such as block storage, solid state drives, and so on. The data storage resources 240, 242, 244 may be provisioned with enough data to cache data retrieved from the warm node repository 256 to perform operations on the data. In some cases, data storage devices 240, 242, 244 may be provisioned with less capacity than data storage devices 226, 228, 230 of hot node pool 218, to conserve resources and/or based on need. In some aspects, warm data nodes 234, 236, 238 may run queries on data managed by the respective nodes, either stored locally in storage devices 240, 242, or 244, or data stored in the warm node repository 256 by data storage service or remote storage 250. In some aspects, upon accessing data from warm node repository 256, the warm data nodes 234, 236, 238 may locally store the data, such as for a configurable amount of time, to reduce latencies in responding to customer requests.

In some aspects, one or more of the master node pool 210, hot node pool 218, or warm node pool 232 may be implemented by an autoscaling group, such that new nodes or virtual machines may be provisioned automatically based on computational needs of managing customer requests, customer data, etc.

In one example, when customers ingest data into the search serviced 202, the data is indexed and stored in hot compute or data nodes 218 first. The hot node pool 218 may periodically rotate hot indices to the warm storage tier provided by the warm node pool 232 in conjunction with warm node repository 256, managed by data storage service 250, such as when those indicted/data has been stored in the hot node pool 218 for a configurable amount of time, or when the data has not been accessed in a configurable amount of time, or based on other configuration migration conditions. By rotating the data and indices to the warm node repository/warm node pool 232, storage costs may be significantly reduced, with only a small impact on performance, as will be described in greater detail below. An example process for ingesting and migrating data will be described in greater detail below in reference to FIG. 4. In some aspects, data stored in the warm node repository 256 may eventually be deleted, upon request or configurable by the customer, when the data is at the end of its lifecycle. In some aspects, migration conditions and triggers for lifecycle events may be managed by the customer, and stored as configurator parameters 254 by the data storage service, such as in a logical data container of data storage service 250. In some cases, the master node pool 210 may access the configuration parameters 254 and initiate the performance of migration and/or lifecycle events.

In some cases, the virtual computer system service 258 may include a warm node interface 260, which configure and enable warm nodes to efficiently access the warm node repository 256. The warm node interface 260 may also include processes that enable the warm node to optimize responding to customer requests to retrieve data from the data storage service 250. An example of a warm node with a warm node interface 260 will be described in greater detail below in reference to FIG. 3.

In some cases, the virtual computer system service 258 may also include or provide a warm node metrics interface or process 262. The warm node metrics process 262 monitor and may obtain performance data concerning individual warm nodes 234, 236, 238, and/or node pools 210, 218, 232, such as load, computing resource usage, response time to queries, etc. In some aspects, the warm node metrics process 262 may be used by the search instance 202 and/or virtual computer system service 258 to add or remove nodes, change resource allocations to specific nodes, and so on to increase performance of the search instance 202, such as by decreasing response times to customer queries. In yet some cases, the warm node metrics process 262 may provide metrics to the customer upon request. In some cases, the warm node metric process may be provided by a separate service of a computing resource service provider, as described in reference to FIG. 1.

Figure 3:
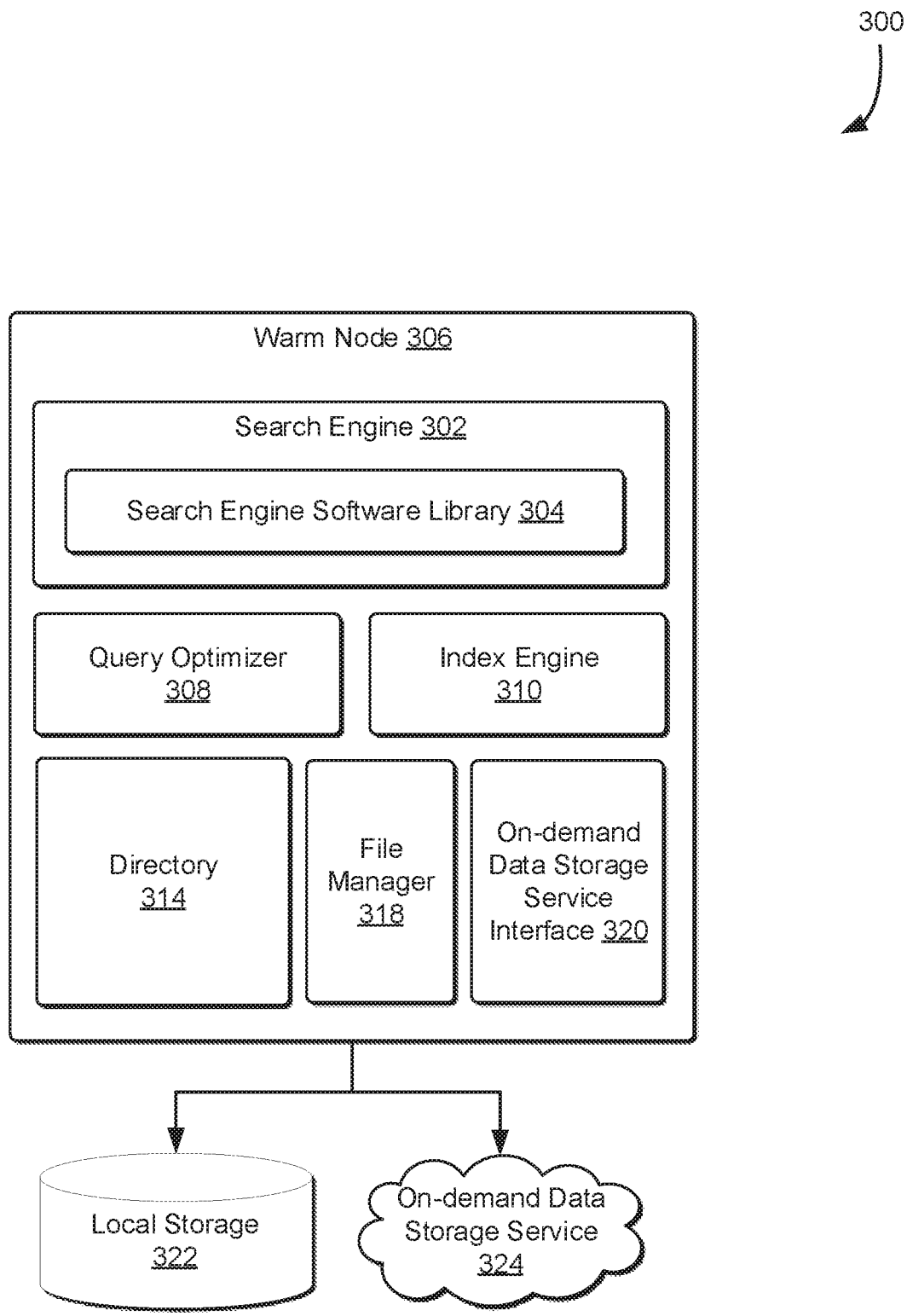
FIG. 3 illustrates an example warm computing node of a data search service, in accordance with at least one embodiment.

FIG. 3 illustrates an example environment 300 including a warm computing node 306 interacting with a search engine 302 and various data storage 322, 324, in accordance with at least one embodiment. As illustrated, warm compute nod 306 may be an example of warm compute nodes 234, 236, 238 described above in reference to FIG. 2, with attached local storage 322, which may be an example of data storage device 240, 242, 244. The warm node 306 may also interact with an on-demand data storage service 324, which may be an example of data storage service 118, 250 described above. The warm node may implement a search engine 302 utilizing a software library 304 to perform searches on data maintained or managed by warm compute node 306. In one specific example, the search engine 302 may be an Elastic Search engine, utilizing a Lucene library 304. It should be appreciated, however, that other search engines and/or libraries may be used to a similar effect, and are contemplated herein.

The warm node 306 may be responsible for a portion of customer data, which may be stored by on-demand data storage service 324. The warm node 306 may communicate with the on-demand data storage service 324 though on-demand data storage service interface 320, which may facilitate one or more networked connections between the on-demand data storage service 324 and the warm node 306. The warm node may include a directory 314, which may including a listing of all data objects or other data partitions the warm node 306 is responsible for and addresses or locations used to access those data objects from the on-demand data storage service 324. In some cases, the directory 314 may include a listing of one or multiple indices managed by the warm node 306. In some cases, a file manager 318 of the warm node 306 may obtain address or location information of data objects or data indices from the on-demand data storage service 324 through the on-demand data storage service interface 320 and update the directory 314 accordingly. In some aspects, the file manager 318 may also update the directory of any data objects stored locally in local storage 322 by the warm node 306. In some cases, address or location data of customer data stored by the warm node 306 and by on-demand data storage service 324 may be referred to as metadata or customer metadata.

Upon receiving a request to access customer data and/or perform one or more operations on the data, the index engine 310 may first search the directory 314 to locate the specified data. In some aspects, the directory 314 may indicate if the data is stored locally by the warm node, such as in local storage 322. If the data is locally stored in local storage 322, the index engine 310 itself or by instructing the file manager 318, access the data from the local storage 322 and perform any indicated operations on the data, including sorting, filtering, etc. In cases where the data is stored remotely by on-demand data storage service 324, the file manager 318 through on-demand data storage service interface 320, may obtain the data, such as may be in the form of one or more files from the on-demand data storage service 324, and load the data into the local storage to access and/or perform operations on the data. Once the operations have been performed, or once the data has been retrieved, the warm node 306 may send the data or results of the one or more operations back to the customer, through the search instance 202 or endpoint 208 as described above.

In some aspects, the warm node 306 may maintain or store at least apportion of customer data in local storage 322, for example, to optimize queries that access that data. In some cases, the warm node 306 may additionally or alternatively store all or a portion of one or more indices that correspond to data that the warm node 306 is responsible for, also to optimize queries that access that data. In some cases, a primary index may be stored locally in local storage 322 to more quickly identify where data is stored in the on-demand data storage service. In yet some cases, all or a majority of one or more indices may be stored locally by warm node 306, for example, based on available storage resources of the warm node, how often specific customer data is accessed, etc. In some aspects, the query optimizer 308 may select data and/or indices to store locally in local storage 322 based on historical or past access to certain customer data and the like. In other cases, the query optimizer 308 may use one or more machine learning techniques to predict what data will be more frequently accessed, and determine to store that data and indices associated therewith locally in local storage. Different optimization processes will be described in greater detail below in reference to FIG. 8.

Figure 4:
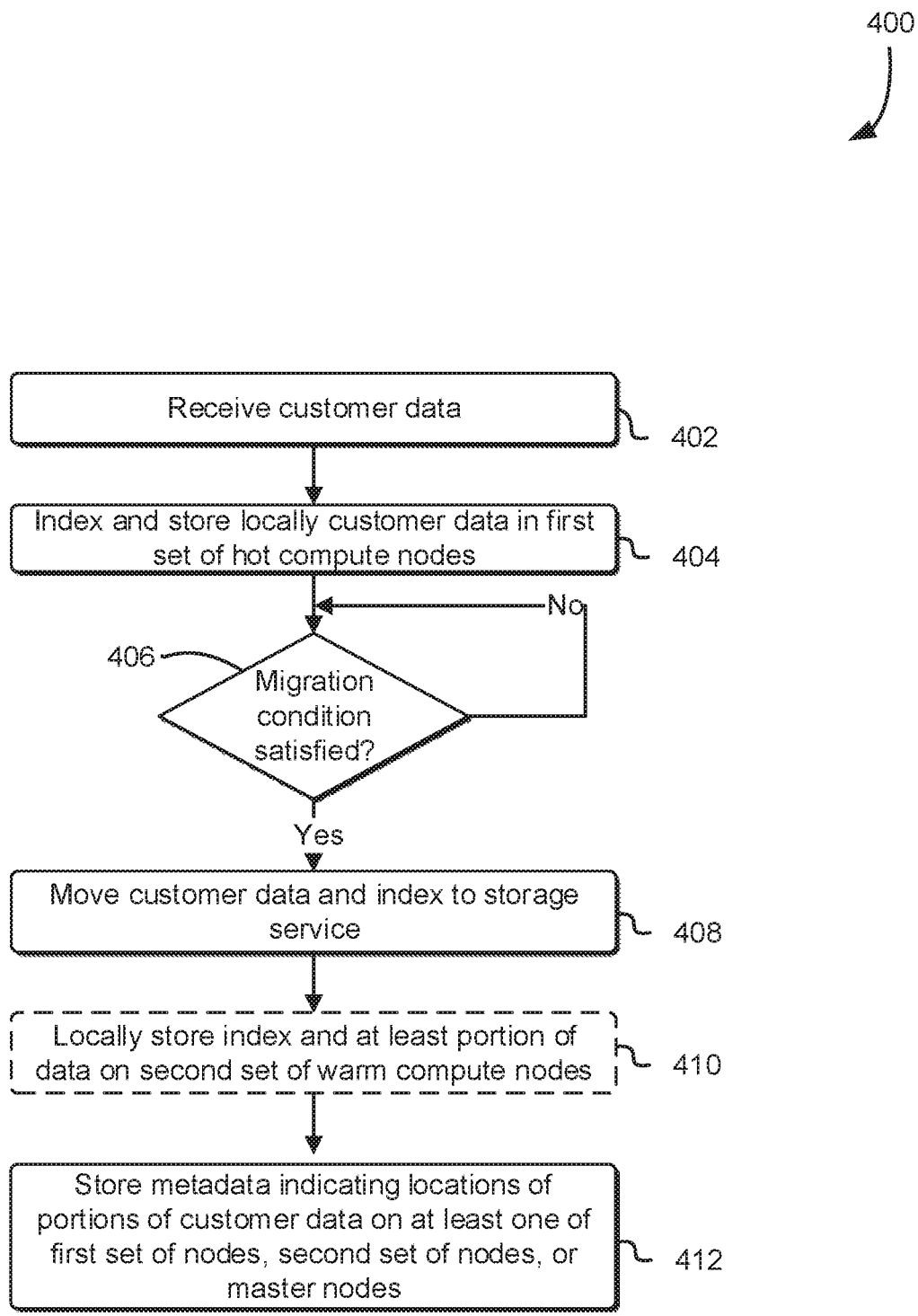
FIG. 4 illustrates an example process for ingesting and indexing data by a data search service, in accordance with at least one embodiment.

FIG. 4 illustrates an example process 400 for ingesting and indexing data by a data search service, in accordance with at least one embodiment. One or more operations of process 400, in some aspects, may be performed by one or more aspects of search service or instance 110, 202, master nodes/pool 212, 214, 216, 210, or hot nodes/ pool 112, 220, 222, 224, 218 described above in reference to FIGS. 1 and 2.

Process 400 may begin at operation 402, where customer data may be received. In some aspects, customer data may be received through a customer end point 208, and may include any of a variety of forms or types of data, such as log data, IoT device generated data, machine generated data, and so on. The data may be indexed and stored locally by one or more compute nodes associated with the search instance, such as one or more hot compute nodes 112, or 220, 222, 224 or node pool 218, at operation 404. In some aspects the data and/or index or indices of the data may be stored in local storage devices 226, 228, and/or 230 attached to the respective compute node 220, 222, 224.

Upon the satisfaction of one or more migration conditions, at operation 406, process 400 may proceed to operation 408 where the customer data and index or indices associated therewith may be moved to a storage service or other remotely storage location, such as data storage service 118, 250, 324. Migrating may include taking snapshot of the data/current state of the hot compute node and storing it via the data storage service, such as in a snapshot repository or warm node repository. In some cases, the migration condition may include a time the data has been stored in the first pool of hot compute nodes being greater than a threshold time or a number of requests to access the data being below a request threshold, or another configurable migration condition. In some cases, default migrations conditions or times may be set, but may then me modified by a customer. In some cases, optionally at operation 410, one or more indices of the customer data that has been migrated, and/or some or all of the data itself, may be stored additionally by one or more warm compute nodes, locally, to facilitate quicker access to that data in the future. In other cases, a warm node, at any time after the data and indices have been stored remotely, may obtain the data and/or indices and then store them locally as well, such as to optimize query response time for queries that involve specific portions of customer data.

At operation 412, at least one node of a set of nodes instantiated for a customer may store metadata indicating locations or addresses of portions of the customer data, such as whether the data is stored locally by one or more warm compute nodes, or stored remotely by a data storage service. In some cases, this metadata may be maintained by warm nodes themselves, maters nodes, or a combination thereof. In some cases, the metadata may include any data relating to or associated with customer data managed by the search instance, and may be automatically collected and attached or pinned to one or more compute nodes, to for example, improve response times to queries involving that metadata.

In some aspects, when the indices are migrated from hot compute nodes or hot tier storage to warm compute nodes or warm tier storage, the indices themselves may be tagged as warm, and made read-only, such that updates to the indices are disabled. Tagging the index may include adding a specific value to an identifier of the index or via various other ways. This may be to ensure that the indices are kept accurate. In some case, a warm index may be moved back to a hot index to enable updating of the index and changing of the underlying data, for example, by instruction n of a customer.

Figure 5:
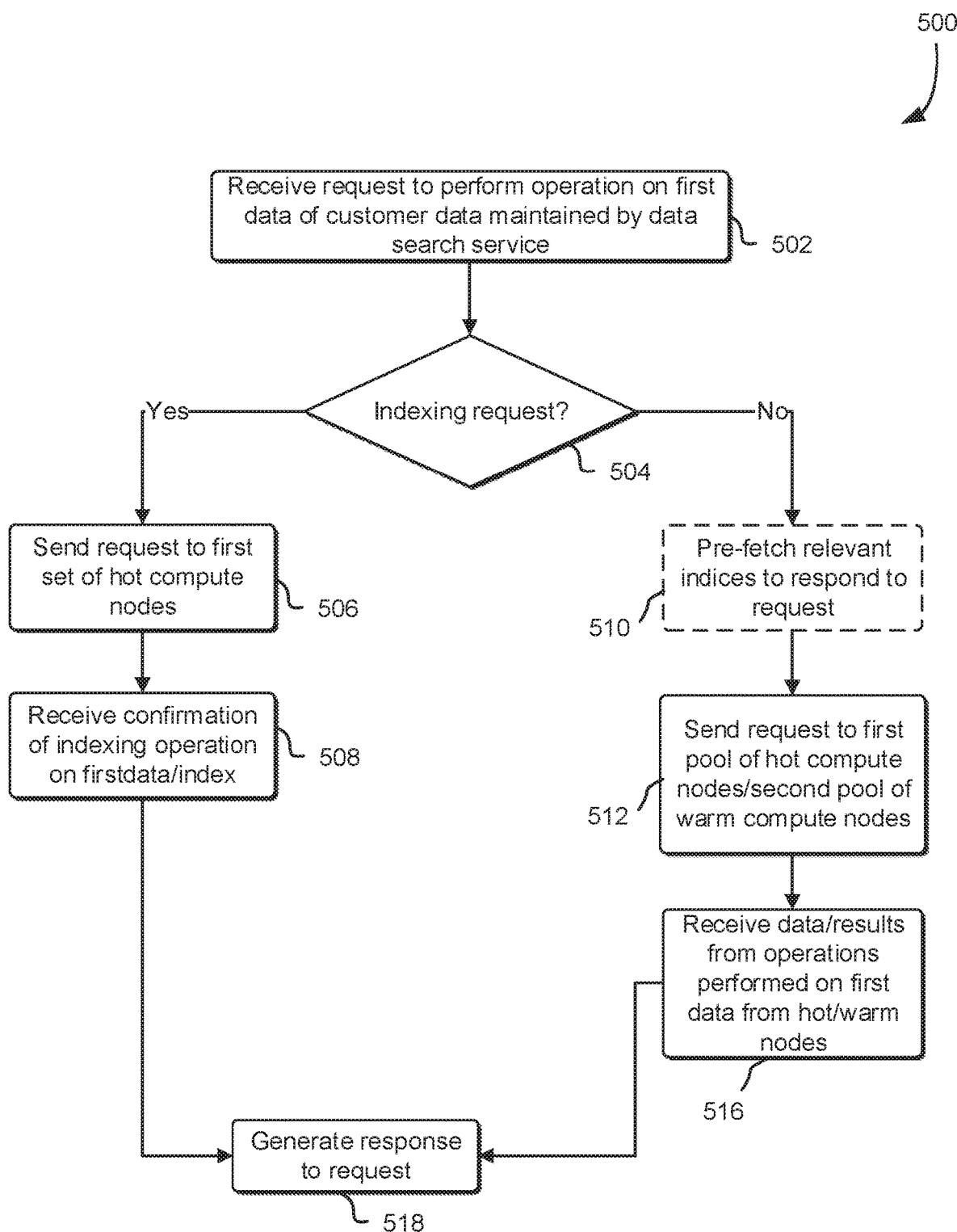
FIG. 5 illustrates an example process for selecting compute nodes to perform operations on data stored and maintained by a data search service, in accordance with at least one embodiment.

FIG. 5 illustrates an example process 500 for selecting compute nodes to perform operations on data stored and maintained by a data search service, in accordance with at least one embodiment. One or more operations of process 500, in some aspects, may be performed by one or more aspects of search service or instance 110, 202, master nodes/pool 212, 214, 216, 210, or hot nodes/pool 112, 220, 222, 224, 218 described above in reference to FIGS. 1 and 2.

Process 500 may begin at operation 502, where a request to perform an operation of first data of customer data maintained by a data search service may be received. Next, at operation 504, it may be determined whether the request is an indexing request, e.g., whether it includes new data that needs to be ingested by the data search service/search instance. If so, the request may be sent to a first set of compute nodes, such as hot compute nodes as describe above. The one or more compute nodes may index and store the data and send a confirmation that the data has been indexed and stored, at operations 506 and 508. The search service may then generate an appropriate response to the request to ingest the data, at operation 518.

If the request does not include an indexing request, at operation 504, process 500 may proceed to optional operation 510, where the relevant indices to respond to the request may be pre-fetched, such as from a data storage service or other remote data storage location of device. Operation 510 may be performed by one or more master compute nodes described above. In some aspects, once the exact blocks or portions of data/indices to respond to the request are known, only those blocks may be pre-fetched. Next, at operation 512, the request may be sent to one or more compute nodes to retrieve the data and perform one or more operations on the data. In some cases, operation 512 may be performed by one or more master compute nodes and/or one or more hot compute nodes. In some cases, metadata indicating which index and the node or nodes responsible for the index may be determined based on metadata, for example, maintained by one or more master nodes and/or accessed from a data storage service. Next, at operation 516 to data/results of operations performed on the data may be obtained and a response to the requested generated, at operation 518.

Figure 6:
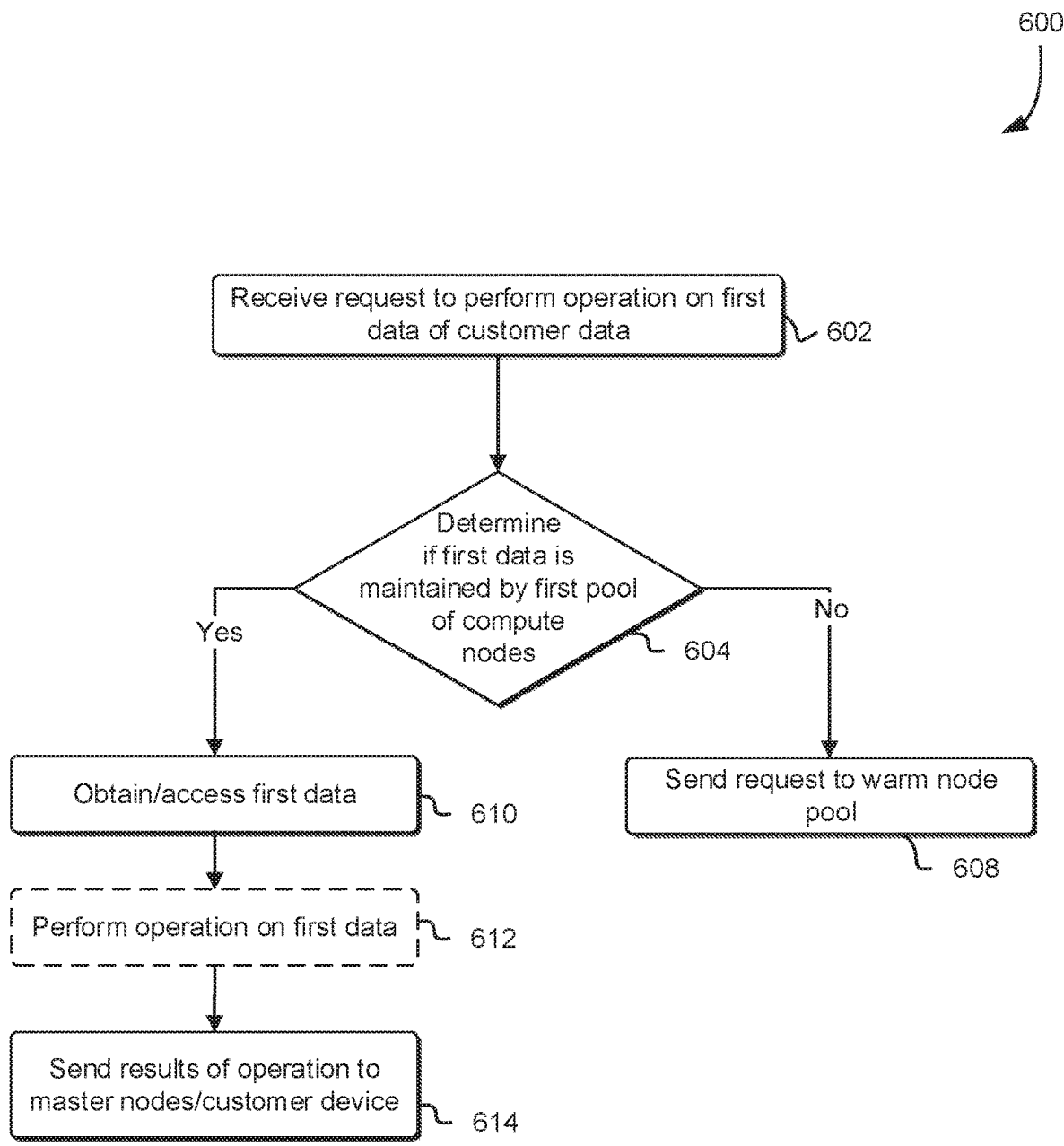
FIG. 6 illustrates another example process for selecting compute nodes to perform operations on data stored and maintained by a data search service, in accordance with at least one embodiment.

FIG. 6 illustrates another example process 600 for selecting compute nodes to perform operations on data stored and maintained by a data search service, in accordance with at least one embodiment. One or more operations of process 600, in some aspects, may be performed by one or more aspects of a hot compute node or pool of hot compute nodes 112, 218, 220, 222, 224 as described above in reference to FIGS. 1 and 2.

Process 600 may begin at operation 602, where a request to perform an operation on first data of customer data may be received, such as by a hot compute node. It may be determined if the first data is maintained by a first pool of compute nodes, such as a pool of hot compute nodes, at operation 604. If yes, the first data may be obtained or accessed by at least one node of the first pool of nodes, at operation 610. Optionally, at operation 612, one or more operations may be performed on the data, and the results of the operation(s) or simply the data in the event no operations were being performed, may be returned at operation 614. In the event the first data in the request is not maintained by the first pool of nodes, the request, at operation 608, may be send to a second pool of compute nodes, such as a pool of warm compute nodes. In some cases, the nodes responsible for customer data in the request may be identified when the request is received. In this case, of the pool of warm nodes or a specific warm node is identified as being responsible for the data, process 600 may be bypassed altogether, such that operations 604 and 608 may not be performed.

Figure 7:
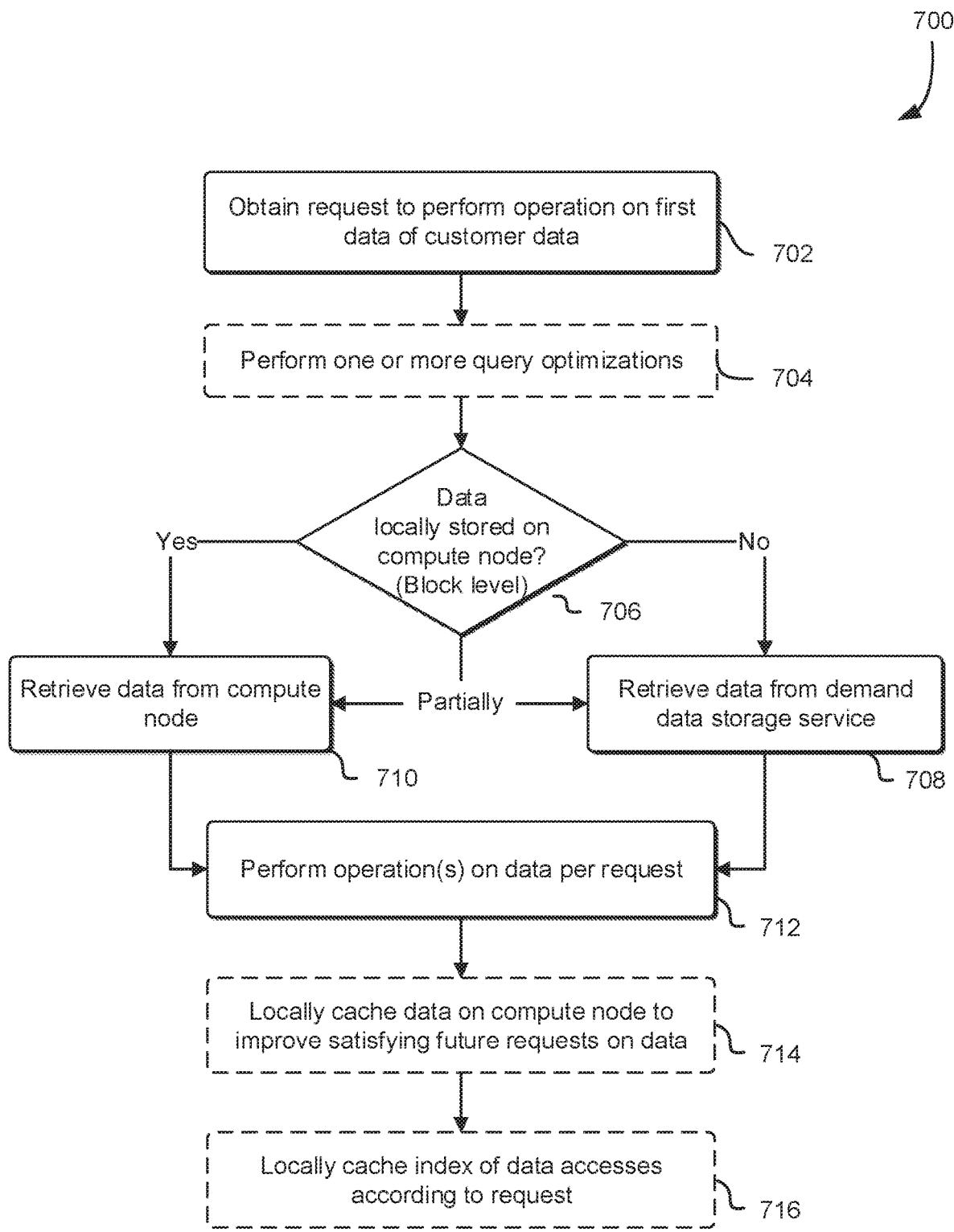
FIG. 7 illustrates an example process for obtaining data and performing operations on that data by a warm compute node of a data search service, in accordance with at least one embodiment.

FIG. 7 illustrates an example process 700 for obtaining data and performing operations on that data by a warm compute node of a data search service, in accordance with at least one embodiment. One or more operations of process 700, in some aspects, may be performed by one or more aspects of a warm compute node or pool of warm compute nodes 114, 234, 236, 238, 232, or 306 as described above in reference to FIGS. 1, 2, and 3.

Process 700 may begin at operation 702, where a request to perform an operation on first data of customer data may be obtained. In some aspects, operation 702 may include intercepting the request between a search engine and a data storage layer. In some cases, optionally, one or more query optimizations may be performed to reduce response time for responding to the request. In this respect, the warm tier or pool of warm nodes may act as an optimizer for responding to requests to access and search customer data managed by a search service. In some cases, operation 702 may be an example of operation 608 of process 600.

Next, at operation 706, the warm compute node may determine if the requested first data is stored locally on the compute node, such as through an index engine 310 and/or directory 314 as described above in reference to FIG. 3. If yes, it may retrieve the data from local storage at operation 710. If not, the compute node may retrieve the data from a data storage service, at operation 708. Upon retrieval of the first data, the compute node may perform one or more operations, such as specified in the request, on the data, at operation 712. In some cases, optimally, the compute node may locally cache/store the retrieved data or a portion thereof to improve satisfying future data requests, at operation 714. In yet some cases, optionally, the compute node may locally store one or more indices of the first customer data to improve responding to similar requests in the future, at operation 716.

Figure 8:
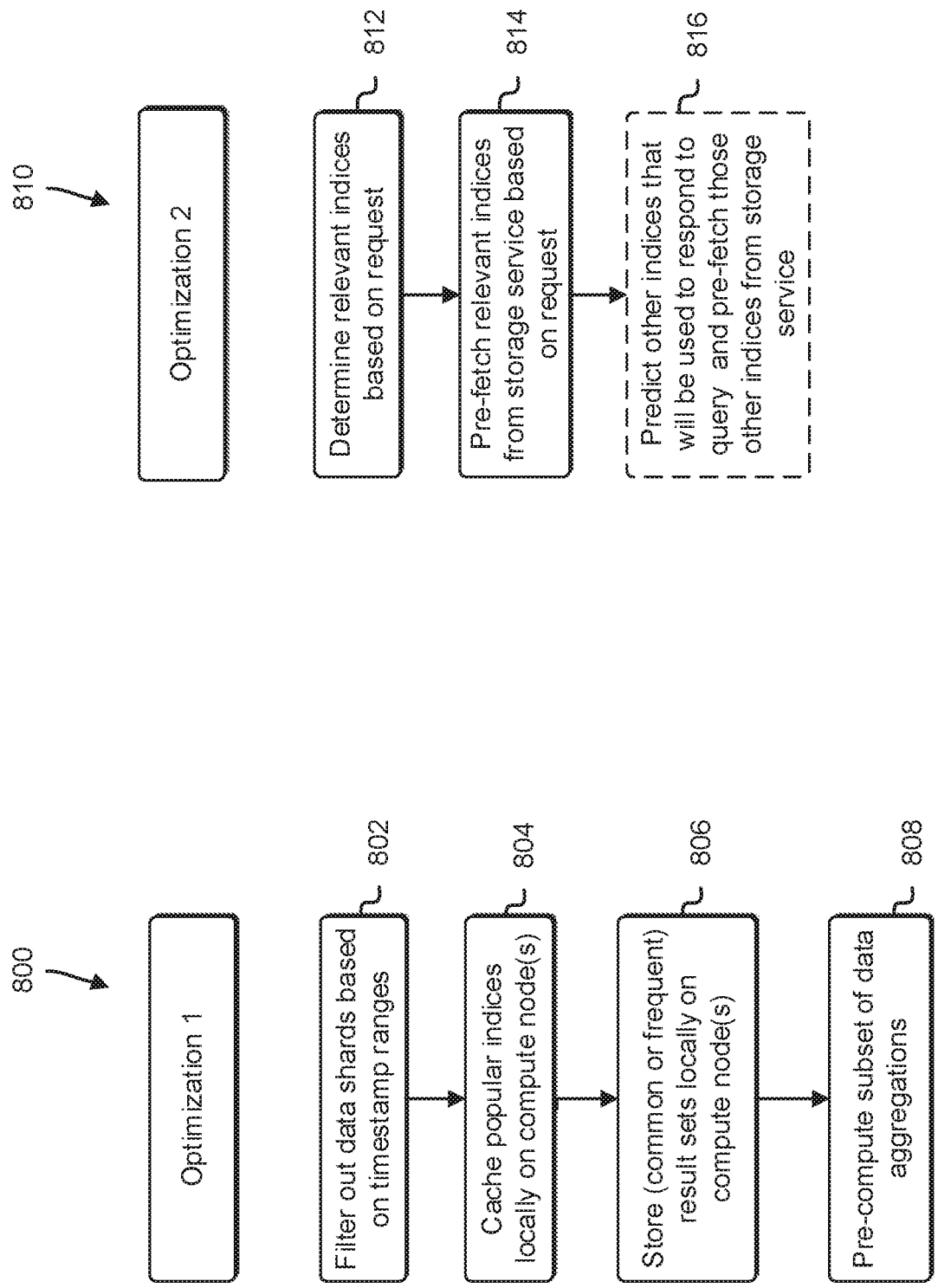
FIG. 8 illustrates example processes for optimizing searches by a data search service, in accordance with at least one embodiment.

FIG. 8 illustrates example processes 800, 810 for optimizing searches by a data search service, in accordance with at least one embodiment. One or more operations of processes 800, 810 in some aspects, may be performed by one or more aspects of a master node or master node pool 212, 214, 216, 210, or warm compute nodes 114, 234, 236, 238, 232, or 306 as described above in reference to FIGS. 1, 2, and 3. Various optimization processes may be implemented at different stages of ingesting data and respond to queries on the data, as will be described in greater detail below.

A first optimization process 800 may begin at operation 802, where data shards or portions of the customer data may be filtered out based on time stamp ranges, in response to a customer request for data. In some cases, this may include automatically dropping entries or logs that have timestamp that is too far in the past to be relevant. Relevancy of the timestamps may be specified in a customer request itself, may be asked for in a prompt to a customer, or may be determined based on other characteristics of the customer request (e.g., when looking for a failure condition, it may be more efficient to only look back a week, a month, etc., based on past queries, or it may be more efficient to choose a time period and search that period first, rather than searching through years of log data).

At operation 804, popular indices (e.g., more frequently accessed, accessed more than a threshold number of times, etc.), may be locally stored by one or more compute nodes, such as warm compute nodes, to enable faster identification and retrieval of customer data in response to a customer request. At operation 806, common or frequently accessed (e.g., where frequently may defined in a number of configurable ways by the customer or set by default), result sets, such as in response to various queries, may be saved and locally stored on one or more compute nodes, such as warm compute nodes, to reduce resources and time needed to respond to overlapping queries.

At operation 808, subsets of data aggregations, such as may be generated in response to one or more queries, may be pre-computed by one or more compute nodes, to reduce time needed to respond to predicted or common queries that may span different time ranges (e.g., a query may require different subsets of data to be combined over a time range, and that same query may be run periodically). The data aggregations may be determined or predicated based on historical query information and other inputs.

It should be appreciated that one or a combination of operations 802-808 may be performed in response to a single query, such as by a master node, warm, node, and/or hot node and/or may be an example of operation 704 described above in reference to FIG. 7.

A second optimization process 810 may begin at operation 812, in which relevant indices may be determined in response to receiving a customer request. The relevant indices may then be pre-fetched, in the case they are stored remotely/by a data storage service, at operation 814, to reduce response time or latency. In some cases, one or more relevant indices may be predicted and pre-fetched, at operation 816, such as based on history queries information and the like Process 810 may be a more specific example of operation 510 described above in reference to FIG. 5.

Figure 9:
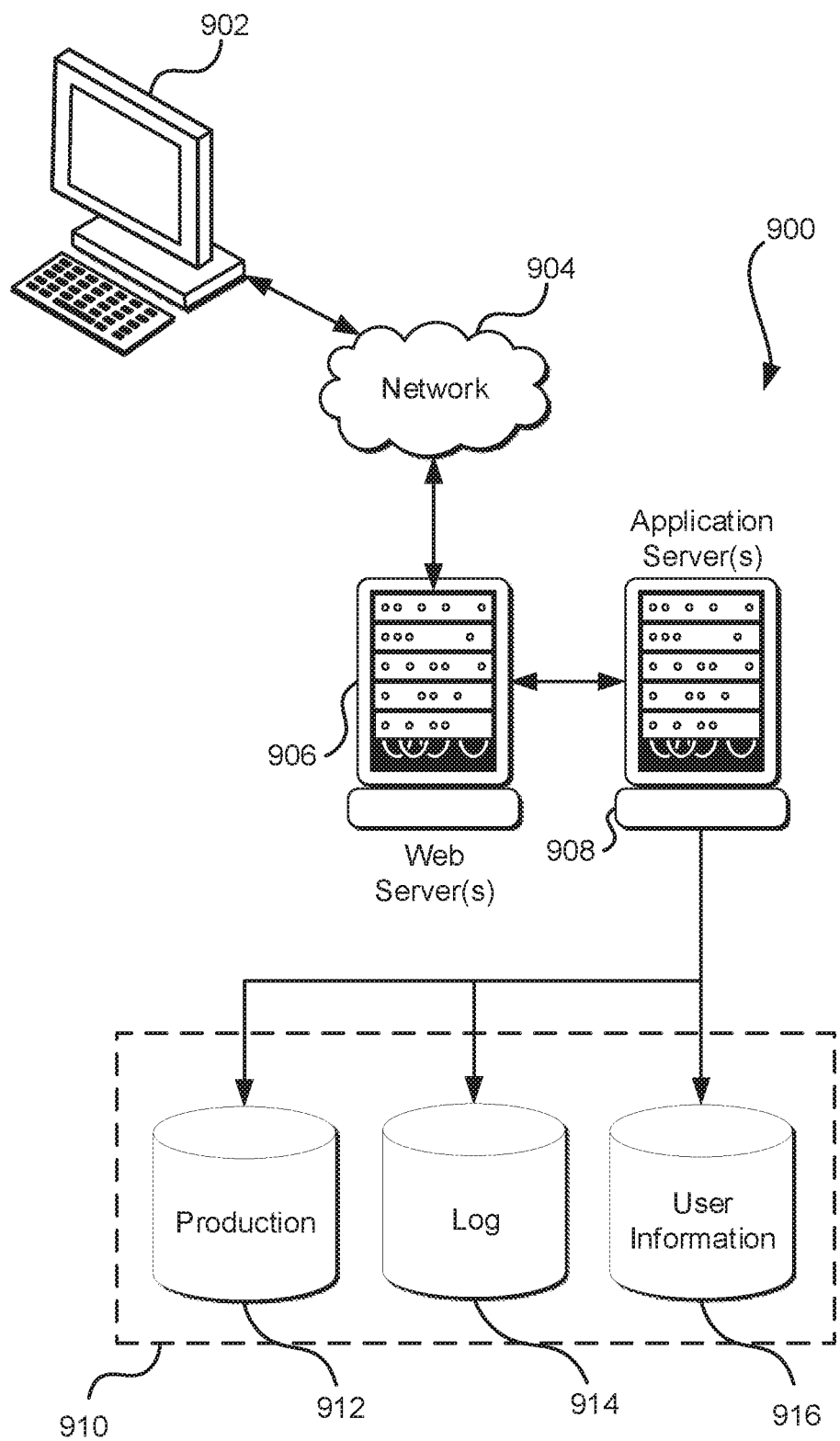
FIG. 9 illustrates a system in which various embodiments can be implemented.

FIG. 9 illustrates aspects of an example system 900 for implementing aspects in accordance with an embodiment. As will be appreciated, although a web-based system is used for purposes of explanation, different systems may be used, as appropriate, to implement various embodiments. In an embodiment, the system includes an electronic client device 902, which includes any appropriate device operable to send and/or receive requests, messages, or information over an appropriate network 904 and convey information back to a user of the device. Examples of such client devices include personal computers, cellular or other mobile phones, hand-held messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 906 for receiving requests and serving content in response thereto, although for other networks an alternative device serving a similar purpose could be used as would be apparent to one of ordinary skill in the art.

In an embodiment, the illustrative system includes at least one application server 908 and a data store 910, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 902 and the application server 908, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 910, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 912 and user information 916, which are used to serve content for the production side. The data store also is shown to include a mechanism for storing log data 914, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 910.

The data store 910, in an embodiment, is operable, through logic associated therewith, to receive instructions from the application server 908 and obtain, update or otherwise process data in response thereto, and the application server 908 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 902. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 900 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 900, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the subject matter set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the subject matter recited by the claims to the specific form or forms disclosed but, on the contrary, the intention is to cover all modifications, alternative constructions, and equivalents falling within the spirit and scope of this disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate various embodiments and does not pose a limitation on the scope of the claims unless otherwise claimed. No language in the specification should be construed as indicating any non-claimed element as essential to the practice of inventive subject material disclosed herein.

Embodiments of this disclosure are described herein, including the best mode known to the inventors for carrying out inventive concepts described herein. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implement method, comprising:
receiving, by a search service, customer data from a customer of a computing resource service provider;
indexing, by the search service, the customer data to produce an index by a first pool of hot compute nodes;
storing, by the search service, the customer data and the index in the first pool of hot compute nodes, individual hot compute nodes of the first pool of hot compute nodes being responsible locally for portions of the customer data and associated portions of the index,
maintaining, by the search service, a first portion of the customer data of the portions of the data in the first pool of hot compute nodes until the migration conditions are satisfied, the migration conditions comprising the first portion of data being stored in the first pool of hot compute nodes for more than a threshold amount of time and fewer than a threshold number of requests to access the first portion of the customer data having been received; and
after the migration conditions are satisfied:
transmitting, by the search service, the first portion of the customer data and the index to a data storage service to be stored remotely thereby; and
causing, by the search service, metadata associated with at least one of the first portion of the customer data and the index to be stored in a second pool of warm compute nodes provisioned by the search service for the customer; and
upon receiving a request to access the first portion of the customer data:
identifying a location of the first portion of customer data;
automatically filtering the first portion of customer data to remove data of the first portion of customer data that corresponding to timestamp information that is beyond a threhsold age, the time stamp information contained in the first portion of customer data; and retrieving the first portion of the customer data from the data storage service according to the metadata.

2. The computer-implemented method of claim 1, further comprising storing at least a portion of the customer data and at least a portion of the index in a local cache of at least one warm compute node of the second pool of warm compute nodes, wherein upon receiving the request to access the customer data, the second pool of warm compute nodes retrieves the customer data from the local cache.

3. The computer-implemented method of claim 1, further comprising:

performing a search of the first portion of the customer data responsive to a first customer request to generate search results;

storing the search results in a local cache of at least one warm compute node of the second pool of warm compute nodes; and responsive to a second customer request, obtaining at least part of the search results from the local cache to fulfill the second customer request.

4. The computer-implemented method of claim 1, further comprising responsive to receiving the request to access the first portion of the customer data:

pre-fetching the index from the data storage service; and obtaining the first portion of the customer data from the data storage service by multiple warm compute nodes of the second pool of warm compute nodes in parallel.

5. A system, comprising:

one or more processors; and memory that stores computer-executable instructions that, as a result of being executed, cause the one or more processors to:

receive a request to perform an operation on data of customer data maintained by a data search service, wherein the data search service stores a first portion of the customer data in a first pool of compute nodes that stores the first portion of the customer data locally and a second portion of the customer data in a second pool of compute nodes that stores the second portion of the customer data remotely;

maintain the first portion of the customer data in the first pool of compute nodes until fewer than a threshold number of requests to access the first portion of customer data having been received within a first time period, then move the first portion of customer data from the first pool of compute nodes to the second pool of compute nodes;

aggregate subsets of the first portion of customer data and the second portion of customer data based on historical query information;

determine that the customer data is stored remotely by a data storage service based on metadata stored by a compute node of the second pool of compute nodes;

obtain the data from the data storage service by the compute node, wherein at least some of the data is obtained from the aggregated subsets of the first portion of customer data and the second portion of customer data; and perform the operation on the data and generate a response to the request based on performance of the operation on the data.

6. The system of claim 5, wherein the metadata stored by the compute node comprises an index of at least part of the customer data.

7. The system of claim 6, wherein the instructions that, as a result of being executed, further cause the one or more processors to store at least one of a portion of the customer data or the index locally by the compute node, wherein upon receiving the request, the compute node retrieves the data locally.

8. The system of claim 6, wherein determining that the data is stored remotely by the data storage service further comprises:

determining that the first pool of compute nodes is not storing the data.

9. The system of claim 5, wherein an index of the customer data is stored remotely by the data storage service, and wherein the instructions that, as a result of being executed, further cause the one or more processors to pre-fetch the index from the data storage service.

10. The system of claim 5, wherein performance of the operation generates search results, and wherein the instructions that, as a result of being executed, further cause the one or more processors to:

store the search results locally on a second compute node of the second pool of compute nodes; and responsive to a second customer request, obtaining at least part of the search results locally from the second compute node to fulfill the second customer request.

11. The system of claim 5, wherein the operation comprises at least one of retrieving the data or sorting the data.

12. The system of claim 5, wherein the compute nodes of the first pool of compute nodes and the second pool of compute nodes comprise virtual machine instances provided by a computing resource service provider.

13. A system, comprising:

one or more processors; and memory that stores computer-executable instructions that, as a result of being executed, cause the one or more processors to:

receive, by a search service, customer data from a customer of a computing resource service provider;

index, by the search service, the customer data to produce an index by a first pool of hot compute nodes provisioned by the search service for the customer;

store, by the search service, the customer data and the index in the first pool of hot compute nodes, individual hot compute nodes of the first pool of hot compute nodes storing portions of the customer data and associated portions of the index that the individual hot compute nodes are responsible for locally;

maintain, by the search service, the customer data and the index in the first pool of hot compute nodes until at least one migration condition is satisfied then transmit the customer data and the index to be remotely stored by a data storage service, wherein the at least one migration condition comprises fewer than a threshold number of requests to access the customer data having been received; and store metadata associated with at least one of the customer data and the index in a second pool of warm compute nodes provisioned by the search service for the customer, wherein the second pool of warm compute nodes, upon receiving a request to access the customer data:

identifies a location of the customer data;

filters the customer data to remove data of the customer data that is outside of a time range based on time stamp information contained in the first portion of customer data; and retrieves the filtered customer data from the data storage service according to the metadata.

14. The system of claim 13, wherein the at least one migration condition additionally comprises an amount of storage time the customer data is stored in the first pool of hot compute nodes exceeding a threshold time.

15. The system of claim 13, wherein the instructions that, as a result of being executed, further cause the one or more processors to store at least one of at least a portion of the customer data or at least a portion of the index locally by at least one warm compute node of the second pool of warm compute nodes, wherein upon receiving the request, the at least one warm compute node retrieves the customer data locally.

16. The system of claim 13, wherein identifying the location of the customer data further comprises determining that the first pool of compute nodes is not storing the customer data.

17. The system of claim 13, wherein the request to access the customer data further comprises instructions to perform an operation on the customer data, wherein performance of the operation generates search results, and wherein the instructions that, as a result of being executed, further cause the one or more processors to:
 store the search results locally on a second warm compute node of the second pool of warm compute nodes; and
 responsive to a second customer request, obtaining at least part of the search results locally from the second warm compute node to fulfill the second customer request.

18. The system of claim 13, wherein an index of the customer data is stored remotely by the data storage service, and wherein the instructions that, as a result of being executed, further cause the one or more processors to pre-fetch the index from the data storage service upon receiving the request to access the customer data.

19. The system of claim 13, wherein the instructions that, as a result of being executed, further cause the one or more processors to obtain the customer data from the data storage service by multiple warm compute nodes of the second pool of warm compute nodes in parallel.

20. The system of claim 13, wherein the metadata comprises information associated with one or more data objects of the customer data previously accessed by at least one warm compute node of the second pool of warm compute nodes.

21. The system of claim 13, wherein the at least one migration condition comprises a frequency at which the customer data is accessed being below a frequency threshold.

\* \* \* \* \*